Feb. 16, 1954     G. K. KOBASHIKAWA     2,668,952
SPECTACLES ADJUSTABLE GLARE SHIELD MOUNTING
Filed April 8, 1952
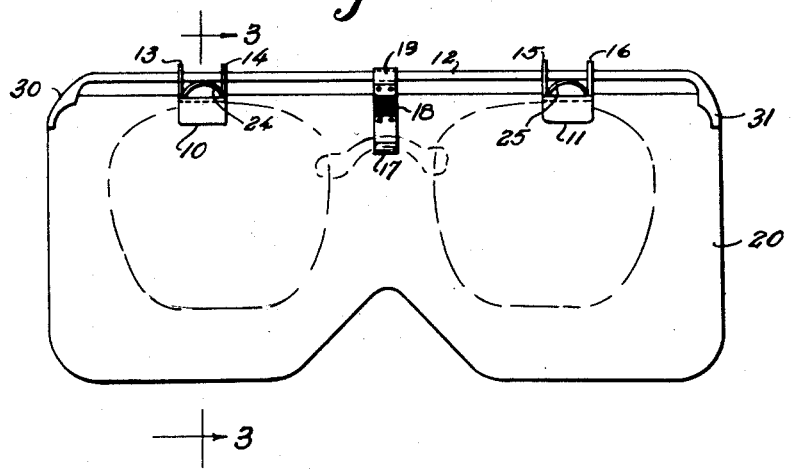
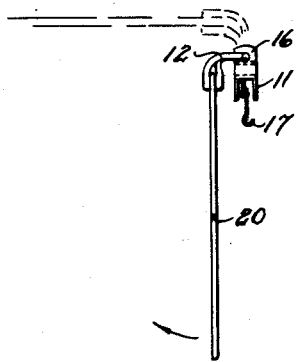
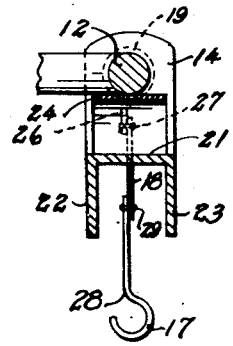
INVENTOR.
Gary K. Kobashikawa
BY *Victor J. Evans Co.*
ATTORNEYS Patented Feb. 16, 1954

2,668,952

UNITED STATES PATENT OFFICE 2,668,952

SPECTACLES ADJUSTABLE GLARE SHIELD MOUNTING

Gary K. Kobashikawa, Honolulu, Territory of Hawaii

Application April 8, 1952, Serial No. 281,139

2 Claims. (Cl. 2—13)

1

This invention relates to glare shields used in combination with conventional glasses, and in particular a translucent or dark shield freely mounted on the upper edges of the rims of a pair of glasses and secured to the nose piece or bridge and in which the connecting parts are provided with a resilient element whereby the shield is adapted to be extended in front of the glasses or flipped upwardly to an outwardly extended position above the glasses.

The purpose of this invention is to provide a protective shield for conventional glasses that is readily snapped on and also readily removed from the glasses and in which means is provided for retaining the shield in an outwardly extended position when not in use, or when it is desired to shade the eyes.

Various types of translucent shields have been provided for use in combination with eye glasses, however, where the shield is clipped over the glasses it is difficult to provide adjusting means so that the shield may be held in front of the glasses and also in an outwardly extended position above the glasses. With this thought in mind this invention contemplates a mounting for protective shields on eye glasses whereby the shield is readily attached to the rim and nose piece of the glasses and in which resilient hinge elements are adapted to suspend the shield in adjusted position in relation to the glasses.

The object of this invention is, therefore, to provide hinge clips for mounting a protective shield on a pair of glasses whereby the shield is adapted to be held in adjusted positions.

Another object of the invention is to provide an improved mounting for retaining a glare shield in adjusted position that may readily be attached to glasses now in use.

A further object of the invention is to provide an improved mounting for retaining a glare shield on a pair of glasses in adjusted position in which the mounting is of a simple and economical construction.

With these and other objects and advantages in view the invention embodies a pair of clips, channel shaped in cross section, adapted to be positioned over the rims of a pair of glasses, a bar positioned on the upper edge of a shield and extended through upwardly extended ears on said clips, a clip having a resilient section therein carried by the bar and positioned to be hooked over the bridge or nose piece of the glasses and springs positioned between the ears of the clips adapted to be positioned on the rims of the glasses for retaining the bar at the edge of the shield in adjusted position.

2

Other features and advantages of the invention will appear from the following description taken in connection with the drawing, wherein:

Figure 1 is a front elevational view illustrating the improved shield mounting showing the shield positioned in front of a pair of glasses.

Figure 2 is an end elevational view showing the mounting, and showing the shield in a vertically disposed position in full lines, and in an outwardly extended horizontal position in dash lines.

Figure 3 is a cross section through one of the mounting clips of the shield taken on line 3—3 of Fig. 1 and showing the parts on an enlarged scale, the bar for supporting the shield being broken away and the shield omitted.

Referring now to the drawing wherein like reference characters denote corresponding parts the improved glare shield mounting of this invention includes a pair of clips 10 and 11, a bar 12 extended through ears 13 and 14 of the clip 10 and 15 and 16 of the clip 11 and a hook 17 which is attached by an elastic strip 18 to an eye 19 extended around the bar 12 which provides supporting means for the shield 20.

As illustrated in the drawing the clips 10 and 11 are channel-shape in cross section, each having a back or upper portion 21 with depending arms 22 and 23 and arcuate springs 24 and 25, positioned between the ears of the clips and between the backs of the clips and the bar 12 resiliently urge the bar away from the backs of the clips whereby the bar is in frictional engagement with openings through the ears of the clips.

The eye 19 is provided with an extension 26 to which the elastic band 18 is attached with fasteners 27 and a shank 28 of the hook 17 is attached to the lower end of the band 18 with fasteners 29.

The ends of the bar 12 are provided with outwardly and downwardly extended sections 30 and 31 which are attached to the corners of the shield 20 and, as illustrated in Fig. 2, with the parts arranged in this manner the shield 20 is adapted to hang downwardly in a vertical position or it may be flipped upwardly to the position shown in dotted lines in Fig. 2 to form a shade.

The combination of the springs 24 and 25 with the elastic band 18 provides means for frictionally holding the shield in the different adjusted positions.

It will be understood that modifications may be made in the design and arrangement of the parts without departing from the spirit of the invention.

What is claimed is:

1. In combination, a glare shield, a pair of clips arranged in spaced aligned relation with respect to each other, each of said clips being provided with a pair of spaced apart ears, a bar extending through said ears, an eye member extending around said bar and provided with an extension, an elastic strip connected to the extension of said eye member, a hook member connected to said strip and adapted to engage the bridge of a pair of glasses, each of said clips being channel shaped in cross section and including an upper portion, spaced parallel arms depending from said upper portion, resilient means for normally urging said bar away from said portions, the ends of said bar being provided with outwardly and downwardly extending sections secured to the corners of said shield.

2. The apparatus as described in claim 1 wherein said resilient means comprises arcuate springs interposed between said upper portions and said ears.

GARY K. KOBASHIKAWA.

References Cited in the file of this patent

UNITED STATES PATENTS

| Number | Name | Date |
|---|---|---|
| 1,596,810 | Cooney | Aug. 17, 1926 |
| 2,388,626 | Wilson | Nov. 6, 1945 |